Jan. 22, 1946.  J. R. McDERMET  2,393,393
DEAERATOR
Filed March 16, 1944  3 Sheets-Sheet 1

INVENTOR
John R. McDermet
by his attorneys
Christy, Parmelee & Stickland

Jan. 22, 1946.  J. R. McDERMET  2,393,393
DEAERATOR
Filed March 16, 1944    3 Sheets-Sheet 2

INVENTOR
John R. McDermet

Jan. 22, 1946.   J. R. McDERMET   2,393,393
DEAERATOR
Filed March 16, 1944   3 Sheets-Sheet 3

INVENTOR
John R McDermet
by his attorneys
Christy, Parmelee Strickland

Patented Jan. 22, 1946

2,393,393

UNITED STATES PATENT OFFICE 2,393,393

DEAERATOR

John R. McDermet, Hempfield Township, Westmoreland County, Pa., assignor to Elliott Company, Jeannette, Pa., a corporation of Pennsylvania Application March 16, 1944, Serial No. 526,733

1 Claim. (Cl. 261—115)

In accordance with the present invention, there are provided certain improvements in apparatus for deaerating water, which apparatus is suitable for both marine and land installations, where there is the need for heating and deaerating water to be used as boiler feed water or for other purposes requiring water which is practically free from dissolved or mechanically entrained oxygen. The invention constitutes a continuation in part of the invention disclosed in my application Serial No. 409,740, filed September 5, 1941, and which has matured into Patent No. 2,344,554, March 21, 1944.

In water heating and deaerating apparatus heretofore in use, it has been customary to employ banks of perforated or slotted trays arranged substantially horizontally in a deaerating space to retard the downflow of water therethrough and break the downflowing water into thin streams flowing over and through the trays and thereby increase the intimacy and thoroughness of contact of the water with the heating and deaerating steam introduced into the heater. While deaerating heaters of this type have usually proved to be effective deaerators, it has been found that for certain uses the heating process is affected disadvantageously by the lack of uniformity in the water distributing action of the trays. Also, when the liquid to be passed down over the trays contains scale-forming materials such as calcium and magnesium salts, it is usually found that the scale which forms and accumulates on the trays rapidly impairs their effectiveness. The effectiveness of a tray bank has also been found to be quite low in marine installations in which the vessel containing the apparatus is subjected to rolling and/or pitching movements. The maintenance of a high tray bank efficiency is quite important as the tray bank section of a deaerating heater forms a substantial portion of the size, weight, and cost of the apparatus, and particularly because inefficient action of some part of the tray bank may result in imperfect treatment of part of the water passing through the heater and consequent contamination of all the water passing through the heater while such conditions exist.

It has been found that an ordinary jet-type water heater in which water is sprayed into a steam-filled chamber will give partial deaeration of the water being heated, but not sufficient to permit its use when substantially complete deaeration is required. In accordance with the present invention, there is provided an improved spray type of deaerator wherein there is obtained "zero oxygen" as indicated by the so-called "Winkler test."

For marine work, the apparatus must be capable of operation while the vessel in which it is installed is rolling, pitching, or tossing. In an installation of this type, particularly for naval vessels, consideration of compactness, lightness, simplicity and fool-proofness must be met.

In accordance with the general invention, the condenser is incorporated within the unit and there are eliminated all moving and unnecessary parts, the necessary parts being utilized in such manner that maximum efficiency and effectiveness of deaerating action are obtained within a minimum space and are also obtained to deaerate contaminated liquids within a minimum time period. Spray devices are used throughout.

In a unit employed for this purpose, it is customary to specify that it shall be effective from three per cent of its rated power to one hundred ten per cent of its nominal rated capacity. A vessel may be called upon to operate for about twenty-five per cent of its life at normal rate capacity, three per cent at overloads, and seventy-two per cent of the period at minimum loads. Thus, the deaerators should operate effectively and efficiently over the entire range.

If steam velocity is alone relied upon to effect spraying and the velocity is created through a throttling valve, as has been customary heretofore, it is apparent that a great deal of automatic adjustment is required for this extreme range of operation to provide the variable quantities of steam. In addition, the temperature levels from which the water is initially heated are extremely variable due to temperature conditions of the particular body of water in which the ship is cruising.

For example, a typical installation provides a variable steam orifice through which varying quantities of the fluid required for different rates of operation are passed. This variable orifice is part of a pressure loaded valve that is automatically adjusted to maintain a constant pressure drop at a substantially constant velocity for the issuing steam. It is apparent that the throttling action and pressure drop involve a material decrease in temperature of the steam. In addition, the operating parts are exposed to heavy reactions and to hydraulic water hammer upon its members due in part to the varying orifice. Consideration, therefore, must be given to increasing the weight of the operating parts so that they will be able to withstand the shock loads.

In the construction generally outlined above, there may be employed a curvilinear vane attached to a conical spraying device, the function of the curvilinear vane being to take water from a low side of the vane and direct it backwards in a circular path to bring it to a lower point near the apex of the cone. This resulting curvilinear path of flow of the water is utilized not only for equalization under pitch and roll conditions of a ship in which the deaerating apparatus is installed, but also to give a rotative movement to the water as sprayed.

However, deaeration units for land installations, installed in stable foundations, do not require the pitch and roll provision of equalization; and in furtherance of the above concept, the present invention provides deaerating element which is useful in both land and marine installations.

Generally speaking, the present invention includes attaching curvilinear vanes to an upper water collecting cone beneath spray nozzles where they provide equalization under pitch and roll conditions of a ship in which the deaerator is installed and also gives rotary movement to the water being sprayed; and also applying radially extending guide surfaces to the spray nozzles. Such radially extending vanes in the deaerating spray unit are entirely adequate for stable foundations. Accordingly, the present invention enables a standardized deaerating spray unit to be used interchangeably with a unit for either marine or land application, and to build the means for pitch and roll equalization in the water collecting cone mounted at the top of the apparatus.

The invention will be understood more readily by reference to the accompanying drawings, which will be understood as being illustrative of one embodiment of the structure of the present invention, it being understood that such variations in the structural details may be made as may be necessary to adapt the invention to varying conditions and uses without departing from the scope and spirit of the invention; and the features of novelty will be pointed out in particularity in the appended claims.

Figure 1:
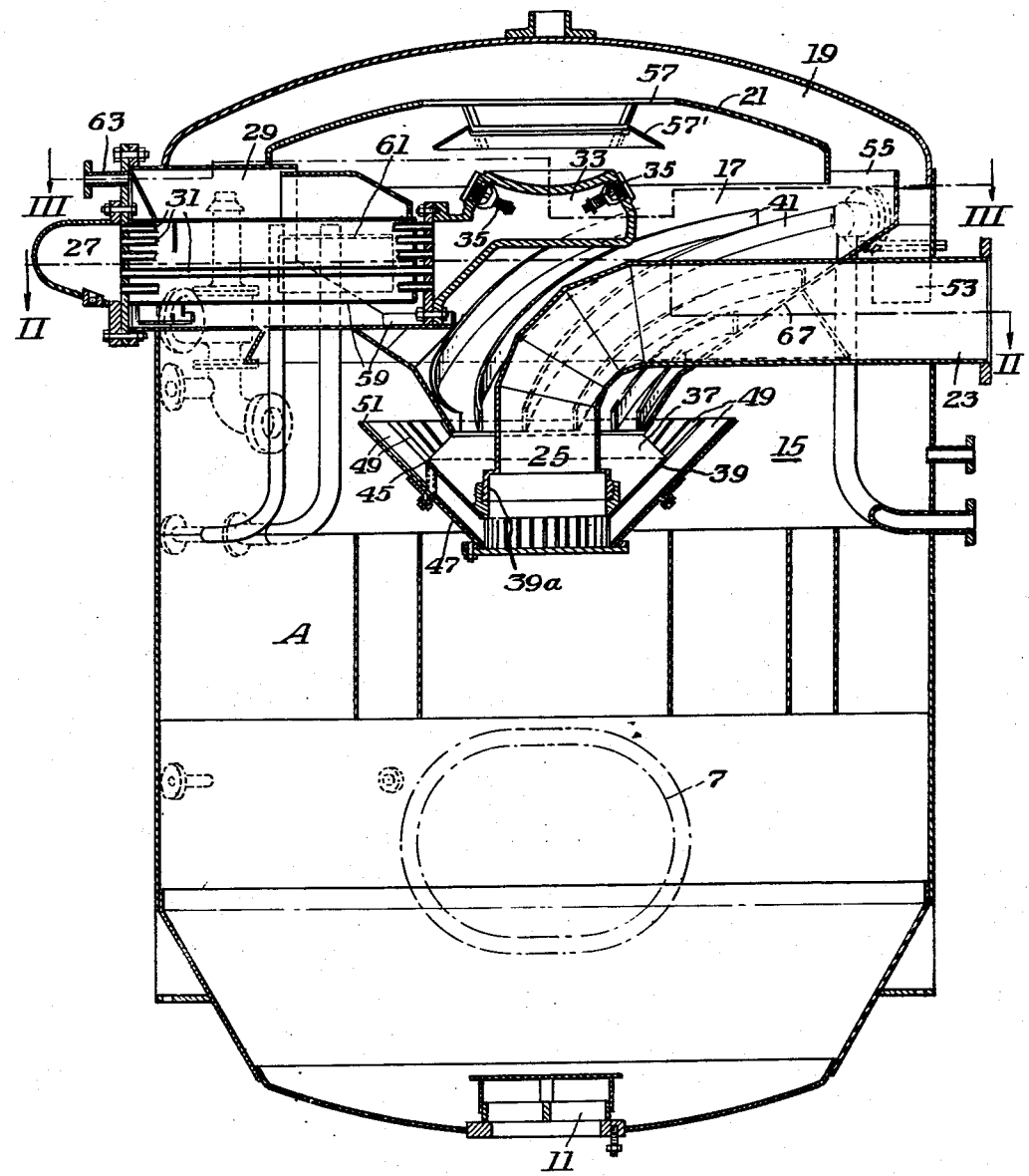
Fig. 1 represents a sectional elevation of a deaerator unit or apparatus embodying the features of the present invention.
Figure 2:
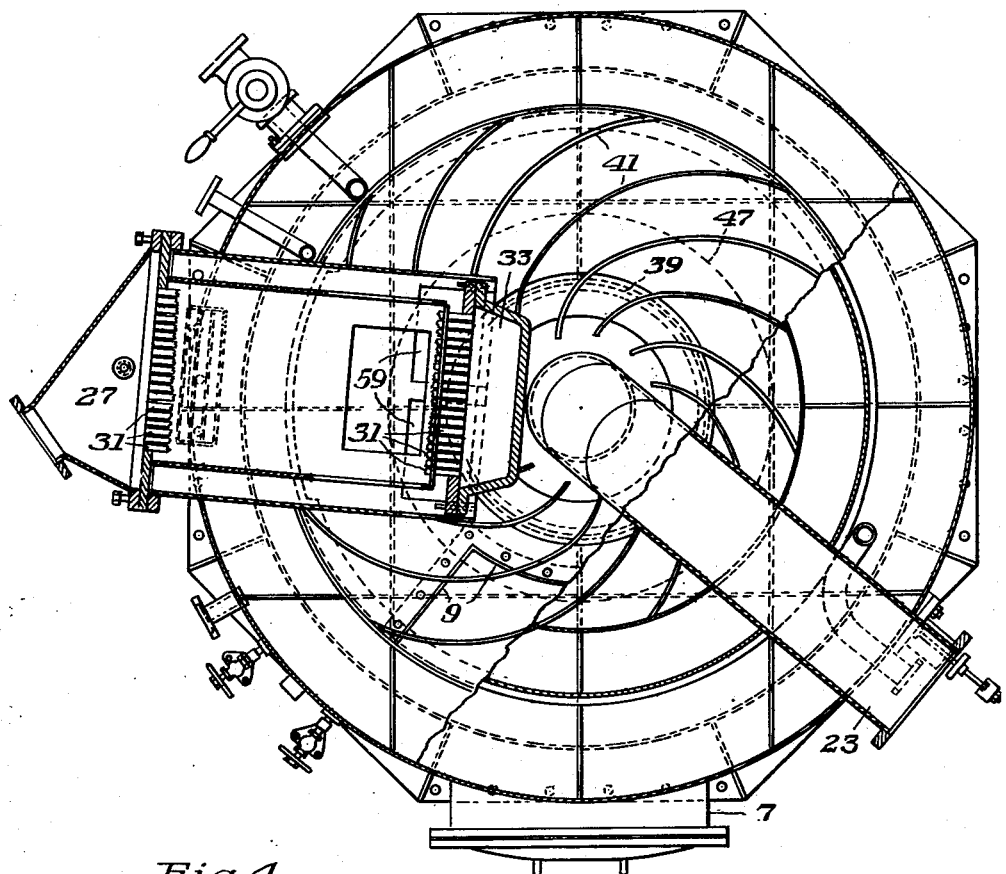
Fig. 2 is a top plan view of the apparatus of Fig. 1, the view being taken along the line II—II of Fig. 1, looking in the direction of the arrows.
Figure 4:
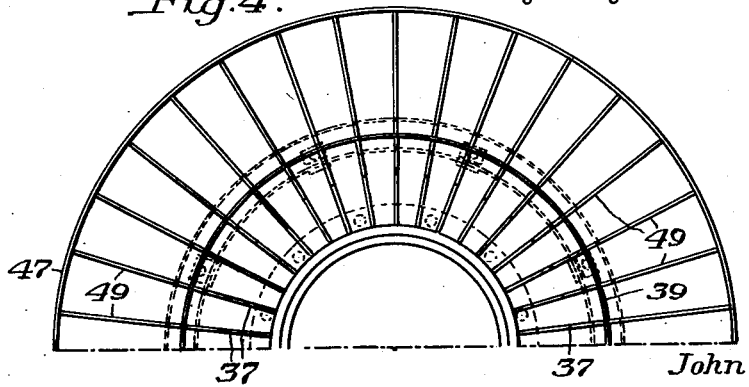
Fig. 4 is an enlarged partial top plan view of the water and steam contacting cones removed from the rest of the unit.
Figure 3:
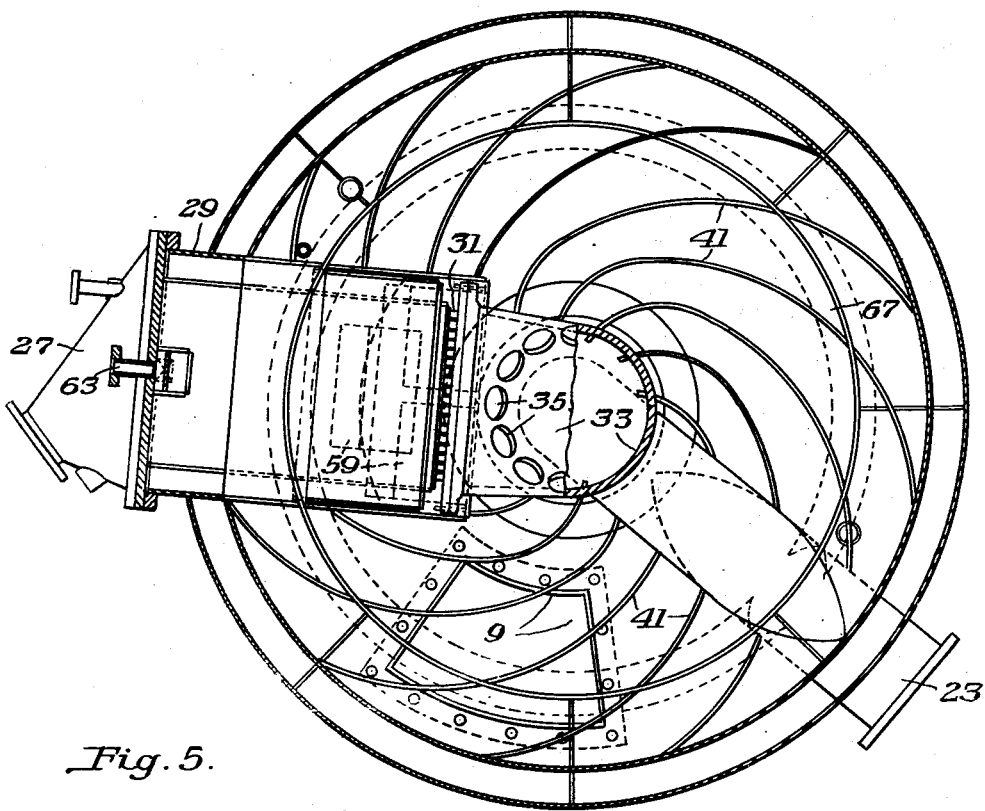
Fig. 3 is a further top plan view of the apparatus of Fig. 1, the view being taken on the line III—III, looking in the direction of the arrows.

In general, the construction of the deaerator is similar to that described in my co-pending application above referred to, except as to portions to which particular attention will be hereinafter directed. For the purpose of understanding the invention, however, the entire structure may be briefly described. The deaerator, designated generally as A, comprises a completely closed vessel having inspection ports at 7 and 9, and having a bottom in which is a hooded outlet 11 for the removal of deaerated water. The top of the vessel is closed by an end wall member 55.

Suspended in the vessel intermediate the top and bottom thereof is an inverted conical member 47 having a flat bottom portion and outwardly flared sides. This member is provided on its inner or upper surface with a plurality of radially extending vanes 49. Set into the member 47 and resting on the vanes 49 is a second inverted cone 39, the uppermost edge of which however terminates well below the edge of the lower cone 47. At the center of the inverted conical member 39 is a flanged connection 39a which is joined to the downwardly extending terminal portion 25 at the inner end of a radially extending steam pipe 23 through which steam is introduced into the unit. Steam which enters the pipe 23 is discharged from the terminal of the pipe and escapes upwardly and outwardly between the two cones 47 and 39, the several vanes 49 forming individual passages for the outflowing steam.

Figure 5:
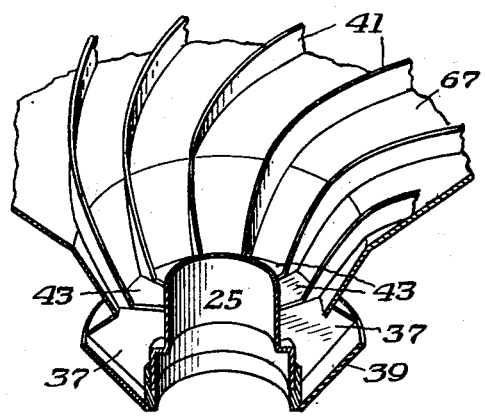
Fig. 5 is a fragmentary perspective view of an inner conic-shaped guide or collector, the view showing the disposition of special water-collecting vanes relative other said inner cone-shaped collector guide.

Above the second cone 39 is a third conical member 67 which extends across the greater portion of the interior of the upper part of the vessel, and which has an upwardly turned flange 55 at its outer edge, and which separates the interior of the vessel into a lower zone 15 and an upper zone 17. A substantially annular passage is provided between the flange 55 and the outer shell of the casing. The conical member 67 is provided with an annular series of spirally curved vanes 41 on the upper surface thereof, these vanes extending downwardly and converging inwardly to the lower central portion of the cone 60. Here, as best shown in Fig. 5, they merge into, and in effect form continuations of radially arranged partitions or baffle plates 37 in the cone member 39. The partitions 37 form in the cone 39 a series of separate pockets 43. The purpose of these vanes is to direct water which collects on the collector plate 67 downwardly into the annular series of pockets formed in the inner cone 39.

There is a condenser 29 projecting radially into the upper part of the deaerator. Contaminated water to be processed is introduced into the condenser inlet 27. It flows through the water tubes 31 of the condenser into a central chest 33. This chest has an annular series of spray nozzles 35 therearound. In the particular arrangement shown, there are 12 of these spray nozzles, but the number of them may be varied according to the size and design of the unit. The water tubes 31 are enclosed within a casing which opens at 61 into the interior of the vessel and which has an offtake pipe 63 through which non-condensible gases may be withdrawn. The condenser casing also has a port 59 through which water formed from the condensation of steam in the condenser casing may be discharged onto the collector cone 67.

Over the collector plate 67 and above the spray nozzles 35 there is an inner baffle or hood 21 which is spaced below the end wall of the vessel and which has a central opening 57 therein, there being a deflector 57' under this opening.

The general operation of the condenser may now be followed. Water entering the inlet 27 travels through the tubes 31, enters the chest 33, and is sprayed as a fine mist into the space 17, above the collector plate 67. Steam entering the pipe 23 travels out between the vanes 49 and is discharged into the space 15 below the collector plate 67. Any steam which is not condensed in the zone 15 flows upwardly through the annular space between the flange 55 and the outer wall of the vessel into the space 19 between the hood 21 and the top of the shell. Some of the steam also flows over the baffle 55 into the space 17. The steam which flows into the space between the hood 21 and the member 55 passes through the opening 57 into the space 17 under the baffle 19, and it is deflected outwardly by the deflector 57'. The water from the spray nozzles thus discharges into an atmosphere of steam. Some of the steam will also enter the condenser casing through the port 61, be condensed by contact with the water tubes 31 and the water of condensation so formed will discharge onto the cone 67 through the opening at 59. As previously mentioned, gases which are not condensible will be withdrawn through the connection 63. The chest 33 is in heat exchange relation with the steam so that the water, first traversing the tubes 31 and then the chest 33, is heated to a substantial extent before it is sprayed into the space 17. The falling spray along with water formed from the steam which it condenses is collected on the collector cone 67 and guided by the curved baffles 41 into the several pockets 43. In these pockets the water will be in heat exchange relation with the terminal portion 25 of the steam pipe. The water entering the pockets will flow over the edge 45 of the cone 39 into the channels formed between the several blades 49 so that the outflowing steam in these channels will bubble or gurgitate through the water which flows over the edge of the cone into the channels. At low rates of operation the velocity of the steam will be relatively low, and the water and steam will have a considerable period of contact in these channels, the steam carrying the water out of the channels slowly. At higher rates of operation the steam will flow at higher velocity and the water will be entrained with it so that at these higher rates of operation the steam and water will be projected into space 15 and thus also remain in contact for a considerable period of time because of moving together over a longer distance. Other steam will rise vertically carrying water with it and much of this water will drop back into the cone. In other words, whether the unit is operating at a low rate, at a moderate rate, or at a high rate, provision is made for the prolonged rate of water with the steam in this part of the deaerator.

The droplets of water which are entrained with the steam and carried out into the space 15 collect in the lower part of the vessel and are withdrawn. The steam as heretofore stated, flows upwardly into the upper part of the vessel to be condensed.

This particular embodiment of my invention differs from my said co-pending application in the provision of the curved vanes 41 which serve to give a relatively uniform distribution of flow of water into each of the pockets 43 notwithstanding the rolling or tilting of the boat or ship on which the deaerator might be mounted. Likewise they will serve to give a relatively even distribution of water in a stationary deaerator. It is of course desirable that none of the pockets 43 be starved of water at any time, because should this condition occur, there would be no spilling of the water over the edge 45 into the channels under the pocket which has a deficient supply, and the steam would tend to escape freely through the channels where there would be no obstructing water. By having the curved vanes 41, no pockets will be starved under normal conditions of pitch and roll of the vessel, or under any other conditions, and consequently water will be supplied to all of the channels between the vanes 49.

While I have described a certain specific embodiment of my invention, it will be understood that various changes and modifications may be made therein without departing from the spirit of my invention and within the scope of the following claim.

I claim:

In a deaerating apparatus, a receiving element of inverted generally conical shape for receiving water being treated, there being a passageway at the central bottom portion of the receiving element, and a plurality of upstanding spiral vanes on the receiving element extending from the bottom portion outwardly toward the periphery, whereby the flow of water over the surface of the cone toward or away from the center due to the rocking of a ship on which said deaerating apparatus may be installed will be in a generally circular path, thereby tending to compensate for the pitch and roll of the vessel in delivering water toward the center passageway, a vessel below said receiving element having a steam supply passage at its center and a plurality of steam outlet channels extending radially from around the center toward the periphery, said receiving element being positioned to discharge the water which flows into it into all of said channels to deaerate the water.

JOHN R. McDERMET.